S. P. TALLMAN.
Stock-Car.
No. 226,131.　　　　　　　　　Patented Mar. 30, 1880.
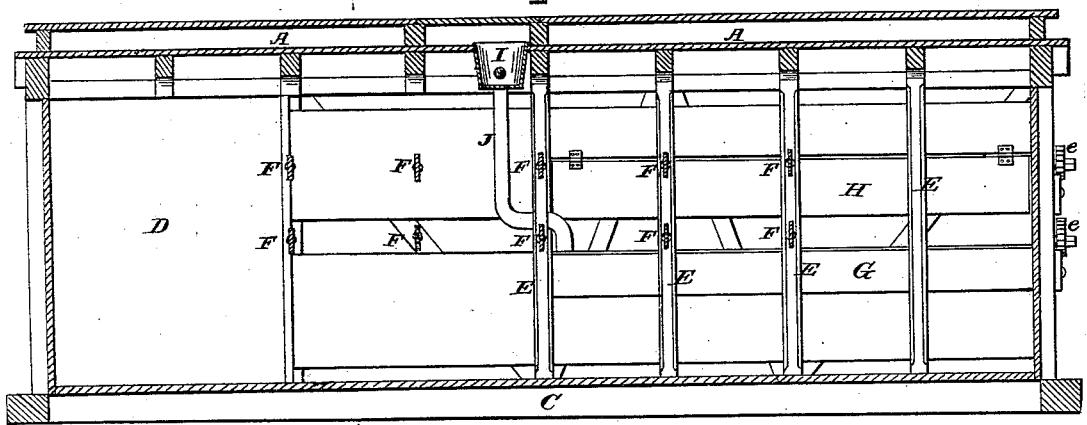
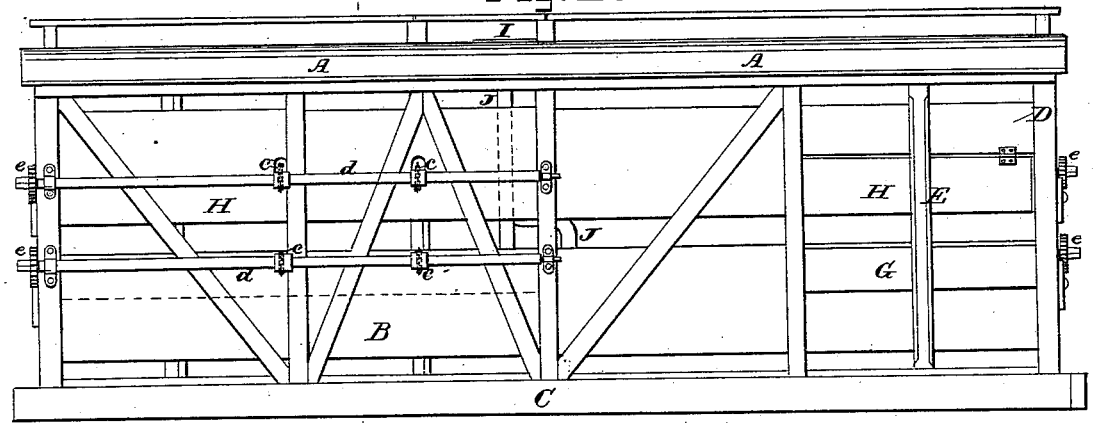
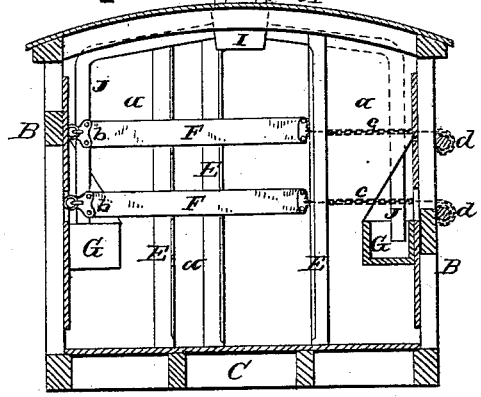
ATTEST:
Albert Day
Edward M. Bray
INVENTOR:
Stephen P. Tallman
by his Attorneys
Burke, Fraser Connett

UNITED STATES PATENT OFFICE.

STEPHEN P. TALLMAN, OF DUNELLEN, NEW JERSEY.

STOCK-CAR.

SPECIFICATION forming part of Letters Patent No. 226,131, dated March 30, 1880.

Application filed January 15, 1880.

*To all whom it may concern:*

Be it known that I, STEPHEN P. TALLMAN, of Dunellen, in the county of Middlesex and State of New Jersey, have invented certain Improvements in Stock or Cattle Cars, of which the following is a specification.

This invention relates to cars for transporting cattle on railways, the object being to provide a car wherein cattle may be carried for several days, if necessary, without unloading them for rest and refreshment.

My invention seeks to overcome the difficulties heretofore encountered in transporting cattle by providing shallow fixed stalls to house the heads and necks of the cattle and extending flexible and detachable partitions from the fixed partitions between the stalls to the opposite sides of the car. The fixed partitions are arranged part on each side of the car, and the door-openings are arranged at the ends of the car, instead of at the center, as in the ordinary freight-car. I also provide the car with feed and water troughs, wherefrom the animals may be refreshed at suitable intervals.

In carrying into effect the above principles I have invented the car which I will now describe with reference to the accompanying drawings, wherein—

Figure 1 is a longitudinal vertical mid-section of a car constructed according to my invention. Fig. 2 is a side elevation of the same. Fig. 3 is a transverse section taken in the plane of the line $x\ x$ in Figs. 1 and 2. Fig. 4 is a detached and enlarged detail view showing the ratchets.

Let A represent the roof, B B the sides, and C the bottom, of a car-body. The trucks are not shown, as they form no part of my invention, and would not aid in its illustration. Instead of placing the doors or doorways in the center of the car at the sides, I place them next the ends, but at opposite ends, on the opposite sides of the car, as seen at D D in Figs. 1 and 2. The doors themselves are not shown, but the letters show the position of the doorways.

E E are posts set up in the car at about equal distances apart, to form, with the partition-boards $a\ a$, extending from them to the sides of the car, shallow stalls to house the heads and necks of the cattle. Gratings or slats may be substituted for the boards $a\ a$. These stalls are arranged, by preference, half on one side of the car and half on the other; but they need not be equally divided. When arranged in this manner, however, the weight of the animals is better distributed in the car than if their heads were all one way.

The bodies of the animals are separated by means of flexible belts, straps, or bands F F, which extend from the posts E across to the opposite side of the car. These may be of any soft, yielding, flexible material, and I prefer to employ rubber belting for the purpose; but leather, ropes, chains, or other similar materials might serve in lieu thereof. I have shown two dividing-belts, one arranged above the other; but any number that may be sufficient or necessary can be employed. To get the cattle into the car it is necessary that these barriers be readily removable; therefore I have made one end, $b$, detachable. An ordinary snap-hook on the belt, arranged to engage a ring or staple in the side of the car, will answer very well, or the snap may be mounted on the car and the ring on the belt. To prevent them from yielding too readily to the pressure of the animals some means must be provided for straining the belts taut after their ends are hooked fast. As a convenient device for this purpose I provide each with a chain, $c$, which passes through the post E and the side of the car, and is wound upon a rod, $d$, arranged to rotate in bearings on the outside of the car. The extremities of the rods $d$ are squared to receive a wrench, whereby they are turned, and are provided with ratchet-wheels $e\ e$, (shown enlarged in Fig. 4,) with which engage pawls $f\ f$. I find it convenient to provide all of the upper belts on one side of the car with a straining-rod, $d$, in common; but each belt may have a separate straining device if it be desired, or all of the belts in the same vertical plane and forming one partition may have a common straining device.

As the door-openings occupy the width of two stalls at each end, it may not be found convenient to stretch belts between the animals occupying these stalls; but as they are near the door and easily removed from the car the fixed partitions between them may be extended out into the car farther than the others, as indicated in Fig. 3. If, however, it be thought best to stretch belts also between the occupants of these stalls, this may readily be accomplished by fixing temporary posts just inside the car, opposite the centers of the doorways, to attach the belts to.

If deemed necessary, the posts E and the ends and sides of the car inside may be padded or covered with some yielding material to protect the cattle against bruises. I do not, however, think that this will be required.

The arrangements for feeding and watering the cattle are as follows: A trough, G, is fixed to the side of the car at the proper height, and extends through the tier of stalls. Just above the trough is a swinging door, H, extending the length of the trough, and adapted, preferably, to swing inward, so as to admit of filling the trough from the outside. This door may be provided with hooks or other suitable fastenings to retain it in position when closed. In the top of the car is fixed a vessel or receiver, I, from which pipes J J extend to the troughs at the sides, as shown. By means of these the troughs may be filled with water from the water-tanks along the road, the nozzle from the tank being inserted into the receiver I, which is located in the center of the car under the run-board. The latter may have that portion over the receiver cut and hinged to turn up, so that the receiver may be got at in watering.

In loading, the animals may be brought in from either side and the stalls at the farther end of the car filled first. As fast as each animal is placed the bands F are hooked fast, and when all are in the bands may be strained until taut by the means before described. The animals may be unloaded from either side, and either one by one, or the belts may be all slackened and disengaged before the car-doors are thrown open. Openings may be provided whereby the belts can all be disengaged from the outside of the car when slackened.

My arrangements for feeding and watering may be adapted to transporting sheep, pigs, and other small animals which are never separated. For such cars the troughs should be placed on or near the floor of the car.

The floor of the car may be level or be sloped, as desired, and the feed-troughs may be provided with plugs or faucets in the bottom for drainage, and with overflow-spouts opening outside the car.

Any materials may be employed in the construction of my improved car.

I am fully aware that feed and watering troughs have been provided in stock-cars, and that various devices for separating the animals have been employed, among which are broad partitions of flexible materials extending entirely across the car and capable of being stretched taut; gates of wood hinged and arranged to be turned in against the side of the car. These have been provided with joints to permit some lateral movement. Shallow stalls formed by triangular boards projecting part way into the car, and wooden bars hinged to these and arranged to extend across the car, have also been employed. None of these, however, are adapted, as I believe, to fulfill the requirements of security and comfort to the animals.

It is the body only of the animal that is injured by the sudden stopping of the car, and it is between the bodies only that the soft and flexible partition is required, while the heads should be separated by a permanent and substantially close partition to prevent the animals from goring each other.

This construction, together with other novel features, I claim as follows:

1. A stock-car provided with flexible partitions composed of two or more rows of bands arranged in different horizontal planes, and those in each plane provided with a stretching device common to all, substantially as herein set forth.

2. A stock-car provided with fixed stalls deep enough to house the heads and necks of the cattle and extending higher than their heads, and partitions of some soft, yielding, flexible material arranged to be strained, so as to separate their bodies, and capable of being detached at one end, substantially as set forth.

3. The combination, in a stock-car, to form partly fixed and partly removable partitions, of the posts E, extending from floor to roof, the partition boards or gratings a, the flexible partitions F, the chains or ropes c, attached to one end of the partition F and extending through the post E to the straining mechanism, the said straining mechanism, and the attaching hooks or snaps b, all arranged substantially as herein set forth.

4. The combination, with the flexible partitions, of the straining device consisting of the bars d, ratchets e, pawls f, and chains or other flexible connections c, all arranged to operate substantially as shown.

5. A stock or cattle car provided with doors D D, arranged as shown, fixed shallow stalls arranged part on each side of the car, separating-belts F F, of flexible material, arranged to be strained, troughs G G, doors H H, receiver I, and pipes J J, leading to the troughs, all arranged substantially as and for the purposes set forth.

In witness whereof I have hereunto signed my name in the presence of two subscribing witnesses.

STEPHEN P. TALLMAN.

Witnesses:
HENRY CONNETT,
ARTHUR C. FRASER.